3,388,162
7- AND/OR 9-NITRO OR AMINO
TETRACYCLINES

Robert Winterbottom, New City, Panayota Bitha, New York, and Henry Marcel Kissman, Nanuet, N.Y., assignors to American Cyanamid Company, Stamford, Conn., a corporation of Maine
No Drawing. Continuation-in-part of application Ser. No. 533,781, Mar. 14, 1966. This application Dec. 1, 1966, Ser. No. 598,233
9 Claims. (Cl. 260—559)

ABSTRACT OF THE DISCLOSURE

This disclosure describes compounds of the class of 7- and/or 9-nitro- or -aminotetracyclines useful as intermediates for the preparation of the corresponding 7- and/or 9-mono(lower alkyl)amino- or -di(lower alkyl)-aminotetracyclines.

---

This application is a continuation-in-part of our copending application Ser. No. 533,781, filed Mar. 14, 1966, now abandoned.

This invention relates to new compounds of the tetracycline family and, more particularly, is concerned with novel tetracyclines which may be represented by the following general formula:

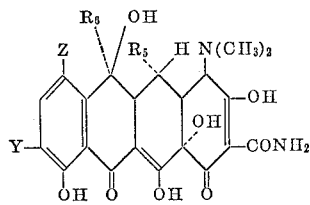

wherein $R_5$ is hydrogen or hydroxy, $R_6$ is hydrogen or methyl, and Y and Z are hydrogen, nitro or amino with the proviso that Y and Z cannot both be hydrogen.

Certain of the new compounds of this invention, e.g., the 7- and/or 9-nitro tetracyclines, are prepared by the nitration of an appropriate tetracycline in either of two ways. In the first situation, tetracycline, 6-demethyltetracycline, 5-hydroxytetracycline or 5-hydroxy-6-demethyltetracycline may be directly nitrated with nitronium tetrafluoroborate in a solvent such as nitromethane or acetonitrile over a period of time of about one hour at room temperature. If a mononitro derivative is desired, then one molar equivalent of nitronium tetrafluoroborate is employed whereas if the dinitro derivative is desired, then two molar equivalents of nitronium tetrafluoroborate are employed. The reaction mixture is then added slowly to a suitable volume of diethyl ether whereupon the desired nitro derivative is precipitated and may be collected by filtration. In the second situation, 11a-chlorotetracycline, 11a-chloro-6-demethyltetracycline, 11a-chloro-5-hydroxytetracycline or 11a-chloro-5-hydroxy-6-demethyltetracycline is nitrated with nitronium tetrafluoroborate in a solvent such as nitromethane or acetonitrile over a period of time of about one hour at room temperature. If the mononitro derivative is desired then 1.2 molar equivalents of nitronium tetrafluoroborate are employed whereas if the dinitro derivative is desired, then 2.4 molar equivalents of nitronium tetrafluoroborate are employed. The reaction mixture is then added slowly to a suitable volume of diethyl ether whereupon the desired nitro derivative is precipitated and may be collected by filtration. The 11a-chloro-nitro derivative is then treated with sodium bisulfite in an aqueous solution at a pH of about 6.0 in order to remove the 11a-chloro group. In both situations, the separation of isomers (e.g., 7-nitro and 9-nitro derivatives) may be accomplished by standard crystallization or chromatographic techniques.

As will be apparent from the examples which follow, the nitration of an appropriate tetracycline results in two mononitro isomers with the nitro group attached to the aromatic ring of the tetracycline nucleus in the ortho-position to the hydroxyl group in one compound and in the para-position in the other compound, or in other words, in one isomer the nitro group is in the 7-position of the aromatic ring whereas in the other isomer it is in the 9-position. When an excess of nitrating agent is employed then the 7,9-dinitro tetracycline is obtained.

The 7- and/or 9-nitro tetracyclines may be reduced either chemically or catalytically to form the corresponding 7- and/or 9-amino tetracyclines. The catalytic reduction may be carried out in a polar solvent such as water; a lower alkanol, e.g., methanol, ethanol, etc.; a lower alkoxy lower alkanol, e.g., 2-methoxyethanol, 2-ethoxyethanol, etc.; or a lower alkanoic acid, e.g., acetic acid, propionic acid, etc.; in a mineral acid solution, e.g., hydrochloric acid, sulfuric acid or the like, and in the presence of a noble metal catalyst such as finely divided palladium, rhodium or other metal of the platinum family. A pure metal may be used or the metal may be used in the form of an oxide or hydroxide and preferably the catalyst is suspended on one of the common carriers such as finely divided alumina, activated charcoal, diatomaceous earth, etc. The reduction may be carried out at temperatures ranging from about 10° C. to about 40° C., and preferably at room temperature, that is around 25° C., and at hydrogen pressures of one to about three atmospheres. The 7- and/or 9-amino tetracyclines so-prepared may be recovered from the reaction mixture by any desired means, as by removal of the catalyst and concentration of the solution. The solution may be evaporated to dryness and purified 7- and/or 9-amino tetracycline may be obtained by precipitation from ethanol-ethyl acetate. The product may be further purified, if desired, by recrystallization in alcohol in a standard manner.

The 7- and/or 9-nitro tetracyclines may also be reduced to 7- and/or 9-amino tetracyclines by a chemical reduction process in which the nitro derivative is contacted with a hydrogen-producing mixture such as metallic zinc in a mildly acidic medium such as hydrochloric acid, acetic acid, etc., at a temperature of from about 10° C. to about 40° C. and for a time of from about 15 minutes to about two hours. The concentration of the nitro derivative in the acidic medium depends upon its solubility. The zinc used for the reaction should preferably be in finely-divided form, for instance, zinc dust and this material should be used to an extent of about 0.35 part by weight of the metal per part by weight of the nitro derivative. Proportions of metal higher than about 5 parts by weight are generally not necessary. The reduced solution contains the desired amino derivative which may be recovered therefrom in a standard manner.

The novel compounds of the present invention are useful as starting materials for the preparation of substituted 7- and/or 9-amino tetracyclines of the following general formula:

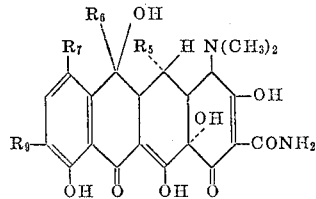

wherein $R_5$ is hydrogen or hydroxy, $R_6$ is hydrogen or methyl, and $R_7$ and $R_9$ are hydrogen, mono(lower alkyl)

amino or di(lower alkyl)amino with the proviso that $R_7$ and $R_9$ cannot both be hydrogen. These substituted 7- and/or 9-amino tetracyclines may be prepared by a reductive alkylation process comprising interacting a novel compound of the present invention (as set forth hereinabove) with a carbonyl compound of the following general formula:

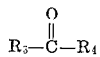

wherein $R_3$ and $R_4$ are hydrogen or lower alkyl, in the presence of a reducing agent. The term "lower alkyl," as used hereinabove, is meant to include all lower alkyl groups having up to about 6 carbon atoms. Accordingly, aldehydes and ketones useful in carrying out this reductive alkylation include, for example, formaldehyde, acetaldehyde, propionaldehyde, n-butyraldehyde, iso-butyraldehyde, acetone, methylethyl ketone, diethyl ketone, etc.

The reductive alkylation process may be accomplished by either chemical or catalytic reduction using procedures well-known to those in the art. Catalytic reduction, which is especially suited for the reductive alkylation of the novel compounds of the present invention, may be accomplished in a solvent for the tetracycline starting compound in the presence of a carbonyl compound and a metal catalyst and hydrogen gas at pressures from atmospheric to super-atmospheric. Ordinarily, the reductive alkylation is conveniently carried out at hydrogen pressures of from about one to about four atmospheres. Temperature does not appear to be critical in the catalytic hydrogenation. Temperatures of from 0° C. to 50° C., and usually room temperature, are preferred since they generally give best results. The metal catalyst may be of the base metal type, such as nickel or copper chromite, or it may be of the noble metal type, such as finely divided platinum, palladium or rhodium. The noble metal catalysts are advantageously employed on a carrier such as finely divided alumina, activated charcoal, diatomaceous earth, etc. in which form they are commonly available. The hydrogenation is carried out until the desired amount of hydrogen gas is absorbed at which point the hydrogenation is stopped. The solvents selected for the catalytic reduction should be reaction-inert, that is, they should not be capable of reacting with the starting materials, product, or hydrogen under the conditions of the reaction. A variety of solvents may be used for this purpose and minimum laboratory experimentation will permit the selection of a suitable solvent for any specific tetracycline starting compound. Generally, the catalytic reductive alkylation may be carried out in solvents such as water; lower alkanols, e.g. methanol, ethanol; lower alkoxy lower alkanols, e.g. 2-methoxyethanol, 2-ethoxyethanol; tetrahydrofuran; dioxane; dimethylformamide; etc.

The reduction conditions and molar proportions of reactants determine whether a 7- and/or 9-mono(lower alkyl)amino or a 7- and/or 9-di-(lower alkyl)amino derivative is the preponderant product. If the di(lower alkyl)amino derivative is desired then an excess of aldehyde or ketone is employed with a moderate excess of acid and hydrogenation is carried out for an extended period. If the mono(lower alkyl)amino derivative is desired, this may be accomplished by using about one mole of aldehyde or ketone or by terminating the reaction when the theoretical amount of hydrogen has been absorbed. The use of excess acid also has a tendency to produce the mono(lower alkyl)amino derivative rather than the di-lower alkyl)amino derivative even when an excess of aldehyde or ketone is present.

A variety of chemical reducing agents may be used in the reductive alkylation process. These include reduction with active metals in mineral acids, e.g. zinc, tin, or iron in hydrochloric acid; reduction with metal couples such as the copper-zinc couple, the tin-mercury couple, aluminum amalgam, or magnesium amalgam; and reduction with formic acid. Of these, reduction with zinc and hydrochloric acid and reduction with formic acid are preferred. When aqueous systems are used in the aforementioned chemical reductive alkylations, it is at times desirable to utilize a water-miscible organic solvent, particularly when the tetracycline starting compound is of limited solubility in the reaction mixture. The water-miscible solvent does not alter the course of the reduction but merely provides for more efficient reduction, e.g. a shorter reaction time by providing more intimate contact of the reagents. A large number of such solvents are available for this purpose and include, among others, dimethylformamide, dimethoxyethane, methanol, ethanol, dioxane, tetrahydrofuran, and the like.

The products are obtained from the reductive alkylation reaction mixtures by standard procedures. For example, the products may be isolated from the catalytic hydrogenation reaction mixtures, after filtration of the catalyst, by precipitation with a solvent such as diethyl ether or hexane or by concentration, usually under reduced pressure, or by a combination of these. Work-up of the chemical reductive alkylation reaction mixtures to obtain the desired products may also be accomplished by known procedures such as precipitation, concentration, solvent extraction, or combination of these procedures. After isolation, the products may be purified by any of the generally known methods for purification of tetracycline compounds. These include recrystallization from various solvents and mixed solvent systems, chromatographic techniques, and counter current distribution, all of which are usually employed for this purpose.

The substituted 7- and/or 9-amino tetracyclines thus produced from the novel compounds of the present invention are biologically active and possess the broad spectrum antibacterial activity of previously known tetracyclines. In particular, the 7-dimethylamino-6-demethyltetracycline possesses extraordinary activity both orally and parenterally against Staphylococcus aureus, strain Smith, and Staphylococcus aureus, strain Rose, infections in mice.

The new tetracyclines of this invention are amphoteric compounds and hence acid-addition salts, that is both mono- and di-salts, may be readily prepared. The preferred acids are the non-toxic pharmaceutically acceptable acids, e.g. the mineral acids such as hydrochloric, sulfuric, phosphoric, and the like although organic acids such as tartaric, acetic or trichloroacetic may also be used. The acid-addition salts may be prepared by treating the new tetracyclines with approximately two equivalents or more of the chosen acid in a suitable solvent.

The invention will be described in greater detail in conjunction with the following specific examples.

Example 1.—Preparation of nitronium tetrafluoroborate

A 17 ml. (20 gm.; specific gravity 1.124) portion of nitromethane and 9.4 ml. (14 gm.) of fuming nitric acid were mixed in a polyethylene container held at −6° C. in a bath consisting of 20% isopropyl alcohol, 80% water and Dry Ice. A 4 ml. (3.94 gm.) portion of hydrofluoric acid was added and the mixture was saturated with boron trifluoride at −6° C. until boron trifluoride fumes were released. The white crystalline precipitate was filtered through a glass funnel under nitrogen atmosphere and then washed with 20 ml. of nitromethane and 20 ml. of 1,1,2-trifluorotrichloroethane (Freon 113). The material was transferred to a 3 neck flask and dried in vacuum at 60–70° C. for 1½ hours.

Example 2.—Preparation of 7-nitrotetracycline and 9-nitrotetracycline

A 1.0 gram portion of tetracycline neutral was dissolved in 40 ml. nitromethane. A 0.312 gram portion of nitronium tetrafluoroborate was added and the solution was stirred for 1½ hours at 25° C. To this was added 500 ml. of ether and the product which precipitated was isolated by filtration. The product was dried at 35° C. yielding 1.203 grams (as the fluoroboric acid salt). The product had the following spectra:

$\lambda_{max.}^{0.1\ N\ H_2SO_4} = 263, 435\ m\mu$ with $263/435 = 4.7$ $\lambda_{max.}^{0.1\ N\ NaOH} = 272, 445\ m\mu$ with $272/445 = 2.75$ The 7- and 9-nitro isomers were separated as described in Example 5.

Example 30.—Preparation of 11a-blocked tetracycline and nitration to give 7 nitro and 9 nitro-11a-blocked tetracycline A 15 gram portion of tetracycline neutral was dissolved in a solvent mixture of 225 ml. of methanol and 375 ml. of benzene. The solution was evaporated to dryness under reduced pressure. The dried product was then dissolved in 187 ml. of distilled monoglyme. To this was added N-chlorosuccinimide and the mixture was stirred for 3 minutes. The solution was filtered. The clear filtrate was diluted with 200 ml. of water and the resulting suspension was stirred for 30 minutes. The product was isolated by filtration and dried at 40° C. for about 16 hours yielding 4.8 gm. of pure material having the following spectra:

$\lambda_{max.}^{0.1\ N\ H_2SO_4} = 268, 340\ m\mu$ with $268/340 = 4.95$ $\lambda_{max.}^{0.1\ N\ NaOH} = 235, 280, 350\ m\mu$ To a suspension of 1.1 gm. of 11a-chlorotetracycline was added 0.388 gm. of nitronium tetrafluoroborate. The resulting solution was stirred for 1 hour at room temperature and then added slowly with stirring to 350 ml. of ether. The product was filtered, slurry washed with two 10 ml. portions of ether and dried at 35° C. and 2.5 mm. of pressure for 10 hours. The yield was 1.114 gm. of material having the following spectra:

$\lambda_{max.}^{0.1\ N\ H_2SO_4} = 265, 345\ m\mu$ with $265/345 = 4.3$ $\lambda_{max.}^{0.1\ N\ NaOH} = 235, 277, 350, 392\ m\mu$ Polarographic analysis gave 7-nitro = 20.7% and 9-nitro = 26.5%.

Example 4.—Preparation of 6-demethyl-7-nitro-tetracycline and 6-demethyl-9-nitrotetracycline A 1.66 gm. portion of 6-demethyltetracycline was dried from a mixture of 45 ml. of methanol and 75 ml. of benzene. The dried product was then dissolved in 80 ml. of nitromethane. A 0.513 gm. portion of nitronium tetrafluoroborate ($NO_2BF_4$) was added to the solution followed by 1½ hours of stirring. The solution was then diluted with 1 liter of ether. The light yellow precipitate was filtered and dried at 40° C. for 16 hours yielding 1.383 gm. of crude product having the following spectra:

$\lambda_{max.}^{0.1\ N\ H_2SO_4} = 265, 354\ m\mu$ with $265/353 = 1.48$ $\lambda_{max.}^{0.1\ N\ NaOH} = 240, 265, 280, 365\ m\mu$ with $380/465 = 6.3$ Example 5.—Chromatographic separation of the 7-nitro and 9-nitro isomers of 6-demethyltetracycline A 100 gm. portion of acid washed Celite was suspended in a solution of 20 gm. of ethylenediaminetetraacetic acid disodium salt in 500 ml. of water. To this was added 500 ml. of 2 N HCl and the solution was stirred for 20 hours at room temperature. The Celite was filtered through a sintered glass funnel and washed first with 6 liters of distilled water by displacement and secondly with 500 ml. of methanol by displacement. The Celite was then dried at 50° C. in a vacuum oven for 20 hours. This Celite was then used with the system heptane:ethyl acetate:methanol:water (5:8:2:2) to effect a separation between 6-demethyl-7-nitrotetracycline and 6-demethyl-9-nitrotetracycline. The purified products have the following spectra:

7-Nitro: $\lambda_{max.}^{0.1\ N\ H_2SO_4} = 260, 352\ m\mu$ with $260/352 = 1.82$ $\lambda_{max.}^{0.1\ N\ NaOH} = 235, 280, 375\ m\mu$ with $380/460 = 3.46$ 9-Nitro: $\lambda_{max.}^{0.1\ N\ H_2SO_4} = 260, 361\ m\mu$ with $260/361 = 1.6$ $\lambda_{max.}^{0.1\ N\ NaOH} = 225, 280, 355, 430\ m\mu$ with $380/460 = 1.09$ Example 6.—Preparation of 11a-blocked-6-demethyltetracycline and conversion to 11a-blocked-6-demethyl-7-nitrotetracycline and 11a-blocked-6-demethyl-9-nitrotetracycline A 10 gm. portion of 6-demethyltetracycline neutral was dissolved in a solvent mixture of 240 ml. of methanol and 360 ml. of benzene. The solution was evaporated to dryness under reduced pressure. The dried product was dissolved in 400 ml. of distilled dioxane. A solution of 3.22 gm. of N-chloro-succinimide in 40 ml. of dioxane was added slowly with stirring. The reaction was complete in less than 1 minute. The solution was filtered and the filtrate was diluted with Skellysolve C. The light yellow precipitate was isolated by filtration and dried in a 35° C. vacuum oven for 16 hours. The yield was 10.5 gm. of crude product having the following spectra:

$\lambda_{max.}^{0.1\ N\ H_2SO_4} = 271, 347\ m\mu$ with $271/347 = 5.31$

To a suspension of 10 gm. of this 11α-chloro-6-demethyltetracycline in 210 ml. of nitomethane and 1.41 ml. of methane-sulfonic acid was added 3.62 gm. of nitronium tetrafluoroborate. The solution was stirred for 2 hours at 24°–27° C. and then filtered. The filtrate was diluted with 4 liters of ether. The light yellow precipitate was collected and dried in a 35° C. vacuum oven for 16 hours. The yield was 10.5 gm. of crude product having the following spectra:

$\lambda_{max.}^{0.1\ N\ H_2SO_4} = 257, 347$ and $430\ m\mu$ with $257/347 = 4.6$ $\lambda_{max.}^{0.1\ N\ NaOH} = 275, 390\ m\mu$ with $380/460 = 1.46$ The 7- and 9-nitro isomers were separated as described in Example 5.

Example 7.—Reduction of 11a-chloro-6-demethyl-7(9)-nitrotetracycline to 6-demethyl-7(9)-nitrotetracycline A 22 gm. portion of a mixture of 11a-chloro-6-demethyl-7-nitrotetracycline and 11a-chloro-6-demethyl-9-nitrotetracycline (prepared as described in Example 6) was suspended in 560 ml. of water. The pH was adjusted to 6.0 with 2 N NaOH. To this was added 44 gm. of sodium bisulfite with stirring while the pH was readjusted to 6.0 with 2 N NaOH. Stirring was continued for 2 hours at room temperature. The solution was filtered and the filtrate was acidified to pH 4.0 with concentrated HCl and the brown solid [crop No. 1 (8.8 gm.)] was isolated by filtration. Acidification was continued. At pH 2.0 a light brown precipitate was obtained [crop No. 2 (3.3 gm.)]. Finally the mother liquor was extracted with butanol at pH 2.0 and the extract was evaporated to dryness under reduced pressure [crop No. 3 (8.6 gm.)] All three crops were analyzed to be mixtures of salts with the following U.V. spectra:

Crop No. 1 $\lambda_{max.}^{0.1\ N\ H_2SO_4} = 260, 355, 420\ m\mu$ with $260/355 = 2.9$ $\lambda_{max.}^{0.1\ N\ NaOH} = 230, 260, 372, 430\ m\mu$ with $380/460 = 1.05$ Crop No. 2 $\lambda_{max.}^{0.1\ N\ H_2SO_4} = 259, 355, 420,\ m\mu$ with $259/355 = 3.01$ $\lambda_{max.}^{0.1\ N\ NaOH} = 221, 260, 372\ m\mu$ with $380/460 = 1.35$ Crop No. 3 $\lambda_{max.}^{0.1\ N\ H_2SO_4} = 261, 352\ m\mu$ with $261/352 = 2.81$ $\lambda_{max.}^{0.1\ N\ NaOH} = 278, 375\ m\mu$ with $380/460 = 2.06$

Example 8.—Preparation of 5-hydroxy-7-nitrotetracycline and 5-hydroxy-9-nitrotetracycline A 1.0 gm. portion of 5-hydroxytetracycline, dried from a mixture of 30 ml. of methanol and 30 ml. of benzene as described in Example 3 was dissolved in 40 ml. of nitromethane. A 0.3 gm. portion of nitronium tetrafluoroborate was added and the solution was stirred for 4 hours at 25° C. The solution was diluted with 500 ml. of ether and the product was isolated by filtration. The yield after drying at 35° C. was 1.706 gm. having the following spectra:

$\lambda_{max.}^{0.1\ N\ H_2SO_4} = 255, 350, 415$ m$\mu$ with $255/350 = 4.05$ $\lambda_{max.}^{0.1\ N\ NaOH} = 253, 275, 400$ m$\mu$ with $380/460 = 1.94$

Example 9.—Preparation of 11a-blocked-5-hydroxytetracycline and conversion to 11a-blocked-5-hydroxy-7-nitrotetracycline and 11a-blocked-5-hydroxy-9-nitrotetracycline A 3.0 gm. portion of 5-hydroxytetracycline neutral was dissolved in a solvent mixture consisting of 135 ml. of methanol and 225 ml. of benzene. The solution was evaporated to dryness under reduced pressure. The dried product was dissolved in 135 ml. of distilled dioxane. A 1.05 gm. portion of N-chloro-succinimide in 15 ml. of dioxane was added slowly with stirring. The reaction was complete in 3 minutes. The solution was filtered. The filtrate was diluted with 390 ml. of Skellysolve C. The product was isolated by filtration and dried at 40° C. for 15 hours. The yield was 2.7 gm.

$\lambda_{max.}^{0.1\ N\ H_2SO_4} = 267, 340$ m$\mu$ with $267/340 = 5.45$ $\lambda_{max.}^{0.1\ N\ NaOH} = 277, 370$ m$\mu$ A 1.0 gm. portion of this 11a-chloro-5-hydroxytetracycline was suspended in 40 ml. of nitromethane. To this was added a 0.34 gm. portion of nitronium tetrafluoroborate. The solution was stirred for 1 hour at 25° C. and was then added slowly with stirring to 350 ml. of ether. The solid was filtered, slurry washed with two 10 ml. portions of ether and dried at 40° C. and 2.4 mm. of pressure for 10 hours. The yield was 0.941 gm. having the following spectra:

$\lambda_{max.}^{0.1\ N\ H_2SO_4} = 258, 345$ m$\mu$ with $258/345 = 4.62$ $\lambda_{max.}^{0.1\ N\ NaOH} = 275, 400$ m$\mu$ Polarographic analysis showed 21.6% 7-nitro isomer and 50.9% 9-nitro isomer.

Example 10.—Reductive alkylation of 6-demethyl-7-nitrotetracycline to give 6-demethyl-7-dimethylaminotetracycline A 5 milligram portion of 6-demethyl-7-nitrotetracycline was dissolved in 1 ml. of methanol containing 0.3 ml. of 0.2 N HCl. To this was added 5 mg. of 10% palladium on carbon and 0.025 ml. of 40% formaldehyde. The mixture was reduced catalytically under atmospheric pressure for 1 hour and 30 minutes at room temperature. The catalyst was filtered off and washed with 1 ml. of methanol. The filtrate and wash was evaporated under reduced pressure to dryness. Chromatographic analysis showed the presence of 6-demethyl-7-dimethylaminotetracycline.

A turbidimetric assay of 6-demethyl-7-nitrotetracycline gave 585 mcg./mg. as tetracycline. The same assay of 6-demethyl-7-dimethylaminotetracycline gave 986 mcg./mg. as tetracycline.

$\lambda_{max.}^{0.1\ N\ HCl} = 266, 354$ m$\mu$ O.D. Ratio $266/354 = 2.48$ $\lambda_{max.}^{0.1\ N\ NaOH} = 245, 265, 385$ m$\mu$ O.D. Ratio $265/385 = 1.7$, $380/460 = 6.25$

Example 11.—Reduction alkylation of 6-demethyl-7-nitrotetracycline to give 6-demethyl-7-dimethylaminotetracycline A solution of 240 mg. of 6-demethyl-7-nitrotetracycline free base, 50 ml. of methanol, 1.22 ml. of 40% aqueous formaldehyde and 0.124 ml. of conc. HCl was mixed with 120 mg. of 10% palladium-on-carbon catalyst. The mixture was reduced at atmospheric pressure and room temperature for one and a half hours. The hydrogen uptake could not be measured accurately because of the vapors of methanol which caused a negative reading. The catalyst was then filtered and the filtrate evaporated to dryness. This material was chromatographed on 55 g. of acid-washed Celite at pH 6.6 using the system:heptane:ethyl acetate:methanol:water (60:40:15:6). An essentially pure material was obtained (54.4 mg.) which analyzed as follows:

$\lambda_{max.}^{0.1\ N\ HCl} = 264, 354$ m$\mu$ with R $264/354 = 1.59$ $\lambda_{max.}^{0.1\ N\ NaOH} = 245, 270$ (shoulder), $384$ m$\mu$ Paper chromatography in a system nitromethane:benzene:pyridine:pH 3.4 phosphate/citrate buffer (20:10:3:3) run at 0° C. showed spots at $R_f = 0.7$ and 0.03 (faint) after treatment with magnesium acetate solution. In the system BuOH, ammonia, pH 8.0 showed two spots at $R_f = 0.5$ and 0.26 after treatment with the magnesium acetate solution. Turbidimetric assay against *Staph. aureus* was 1700 $\gamma$/mg. as tetracycline.

Example 12.—Reductive ethylation of 7-nitrotetracycline to yield 7-diethylaminotetracycline A 450 mg. portion of 7-nitrotetracycline was dissolved in 30 ml. of ethanol. To this was added 2.1 ml. of 1 N sulfuric acid, 1.0 ml. of acetaldehyde and 100 mg. of 10% palladium-on-carbon. The mixture was shaken with hydrogen for 1.5 hours, and the catalyst was then removed by filtration. The filtrate was poured into about 400 ml. of ether. The precipitate which formed weighed 468 mg. after filtering and drying. Paper chromatographic analysis showed the compound to be 7-diethylaminotetracycline.

Example 13.—Preparation of 7-dimethylamino-5-hydroxytetracycline

A solution of 1.0 g. of 7-nitro-5-hydroxytetracycline in 75 ml. of methanol, 6 ml. of 40% aqueous formaldehyde and 0.52 ml. of 35% aqueous hydrochloric acid was catalytically reduced in the presence of 250 mg. of 10% palladium on charcoal catalyst until five moles of hydrogen were absorbed. The catalyst was filtered off and the filtrate evaporated to dryness. When purified by partition column chromatography, there was obtained 620 mg. of 7-dimethylamino-5-hydroxytetracycline. Paper chromatography in a system containing nitromethane, benzene, pyridine and pH 3.4 phosphate/citrate buffer run at 0° C. showed the product as the major spot.

Example 14.—Preparation of 7- and 9-dimethylaminotetracycline

Two grams of a mixture of 7- and 9-nitrotetracycline was cataltyically reduced as in the previous example. The dried residue after evaporation of the methanol was chromatographed to separate the isomeric 7- and 9-dimethylaminotetracyclines. The chromatographic system used consisted of a support of 350 g. of acid washed Celite 545 (a commercial diatomaceous earth) and the solvent system heptane:ethyl acetate:methanol:water (60:40:15:6 by volume). The solvent fractions containing the 7-dimethylaminotetracycline and 9-dimethylaminotetracycline were evaporated to dryness. The residues were dissolved in warm chloroform, filtered to remove traces of buffer from the column and evaporated to dryness to recover 7-dimethylaminotetracycline and 9-dimethylaminotetracycline.

What is claimed is:
1. A compound selected from the group consisting of tetracyclines of the formula:

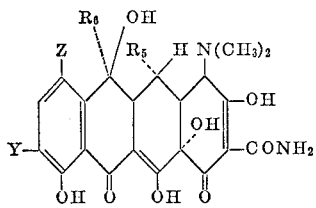

wherein $R_5$ is selected from the group consisting of hydrogen and hydroxy, $R_6$ is selected from the group consisting of hydrogen and methyl, and Y and Z are each selected from the group consisting of hydrogen, nitro and amino with the proviso that Y and Z cannot both be hydrogen; and the non-toxic acid-addition salts thereof.

2. A compound according to claim 1 wherein $R_5$ is hydrogen, $R_6$ is methyl, Z is nitro and Y is hydrogen.

3. A compound according to claim 1 wherein $R_5$ is hydrogen, R is methyl, Z is hydrogen and Y is nitro.

4. A compound according to claim 1 wherein $R_5$ is hydrogen, $R_6$ is hydrogen, Z is nitro and Y is hydrogen.

5. A compound according to claim 1 wherein $R_5$ is hydrogen, $R_6$ is hydrogen, Z is hydrogen and Y is nitro.

6. A compound according to claim 1 wherein $R_5$ is hydrogen, $R_6$ is hydrogen, Z is nitro and Y is nitro.

7. A compound according to claim 1 wherein $R_5$ is hydroxy, $R_6$ is methyl, Z is nitro and Y is hydrogen.

8. A compound according to claim 1 wherein $R_5$ is hydroxy, $R_6$ is methyl, Z is nitro and Y is amino.

9. A compound according to claim 1 wherein $R_5$ is hydroxy, R is hydrogen, Z is amino and Y is nitro.

References Cited

UNITED STATES PATENTS 3,081,346   3/1963   Stephens et al. _____ 260—559

NICHOLAS S. RIZZO, *Primary Examiner.*

Disclaimer 3,388,162.—*Robert Winterbottom*, New City, *Panayota Bitha*, New York, and *Henry Marcel Kissman*, Nanuet, N.Y. 7- AND/OR 9-NITRO OR AMINO TETRACYCLINES. Patent dated June 11, 1968. Disclaimer filed May 9, 1969, by the assignee, *American Cyanamid Company*.
Hereby enters this disclaimer to all of the claims of said patent.
    [*Official Gazette October 14, 1969.*]